United States Patent
O'Connor

[11] Patent Number: 5,520,868
[45] Date of Patent: May 28, 1996

[54] FORMING PRESSURE SENSITIVE ADHESIVE TAPE

[75] Inventor: Lawrence J. O'Connor, Winnipeg, Canada

[73] Assignee: KT Industries Inc., Fort Wayne, Ind.

[21] Appl. No.: 260,420

[22] Filed: Jun. 14, 1994

Related U.S. Application Data

[63] Continuation-in-part of Ser. No. 185,063, Jan. 24, 1994, abandoned.

[51] Int. Cl.$^6$ .......................... B29C 47/06; B29C 55/06
[52] U.S. Cl. .................. 264/171.13; 156/244.11; 264/172.19; 264/173.15; 264/173.16; 264/173.18; 264/173.19; 264/288.4
[58] Field of Search .................. 264/171, 288.4, 264/146, 290.2, 171.13, 172.19, 173.15, 173.16, 173.18, 173.19; 425/131.1, 462; 156/244.11

[56] References Cited

U.S. PATENT DOCUMENTS

| | | | |
|---|---|---|---|
| 3,871,947 | 3/1975 | Brekken | 264/171 |
| 3,984,509 | 10/1976 | Hall et al. | 264/171 |
| 4,379,806 | 4/1983 | Korpman | 264/171 |
| 4,451,533 | 5/1984 | Wong et al. | 264/288.4 |
| 4,495,124 | 1/1985 | Van Erden et al. | 264/289.3 |
| 4,513,028 | 4/1985 | Aritake | 264/288.4 |
| 4,844,962 | 7/1989 | May et al. | 428/43 |
| 4,887,714 | 12/1989 | O'Connor | 206/411 |
| 5,047,196 | 9/1991 | Zuckerberg et al. | 264/171 |
| 5,064,579 | 11/1991 | Kendall et al. | 264/288.4 |
| 5,118,566 | 6/1992 | Wilhelm et al. | 156/244.11 |
| 5,145,544 | 9/1992 | Leseman et al | 264/171 |
| 5,145,718 | 9/1992 | Pedginski et al. | 427/171 |
| 5,173,141 | 12/1992 | Leseman et al. | 264/171 |
| 5,264,278 | 11/1993 | Mazurek et al. | 428/317.3 |

FOREIGN PATENT DOCUMENTS

| | | |
|---|---|---|
| 1510682 | 12/1967 | France . |
| 2078149 | 11/1971 | France . |
| 8601550 | 3/1986 | WIPO . |

*Primary Examiner*—Jeffery R. Thurlow
*Attorney, Agent, or Firm*—Adrian D. Battison; Murray E. Thrift

[57] ABSTRACT

A narrow tape of high strength and low elongation to break for use for example as a tear tape or packaging tape is formed by extruding continuously from preferably polypropylene a strip of tape and applying to the strip an adhesive layer on one surface. After extrusion and after application of the adhesive strip, the tape is drawn longitudinally by an amount sufficient to substantially fully orient the tape in the longitudinal direction to provide the required low elongation to break and high strength. The tape is extruded in a width so that when drawn the width of the drawn tape is equal to the required width of the finished tape. Instead of slitting the tape from a wide web, therefore, the tape is extruded directly in tape width without slitting or trimming thus obviating any waste. In addition the longitudinal drawing of the tape reduces the thickness of the adhesive to a thickness just sufficient to provide the required level of pressure sensitive adhesion without use of excess materials.

17 Claims, 2 Drawing Sheets

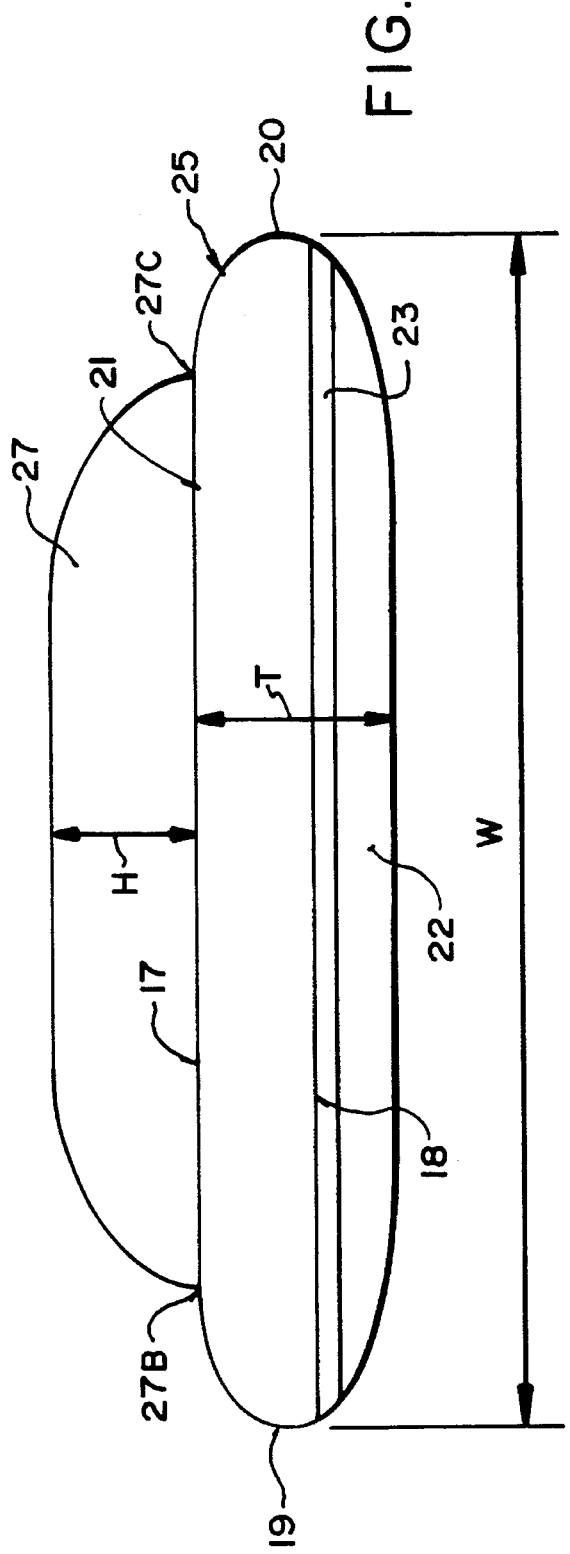

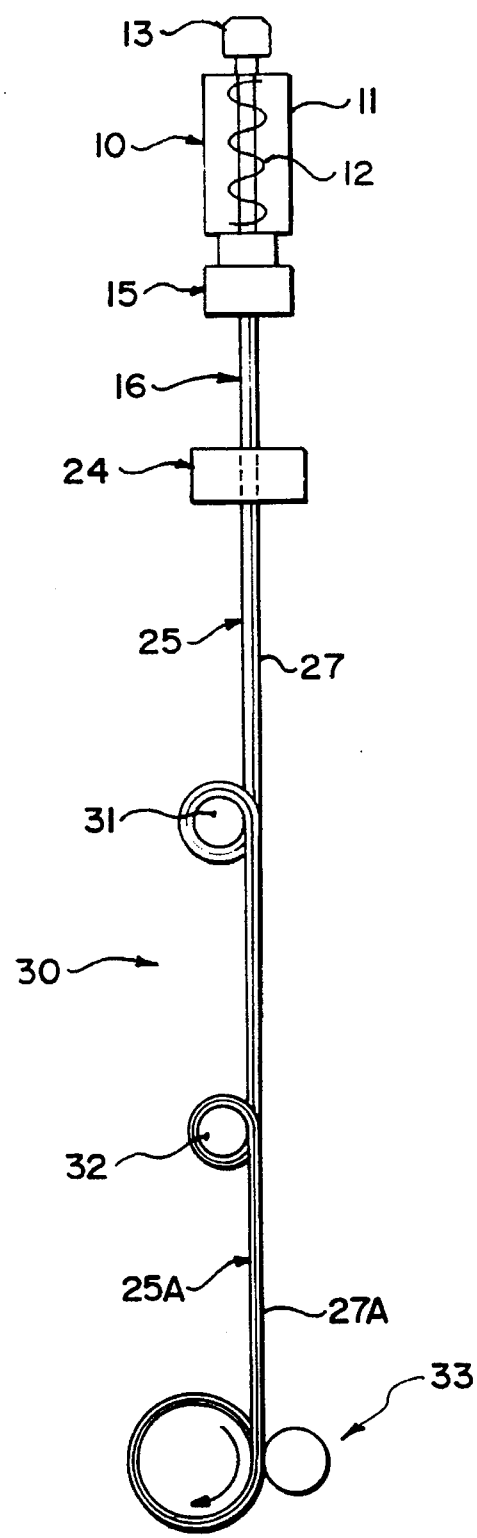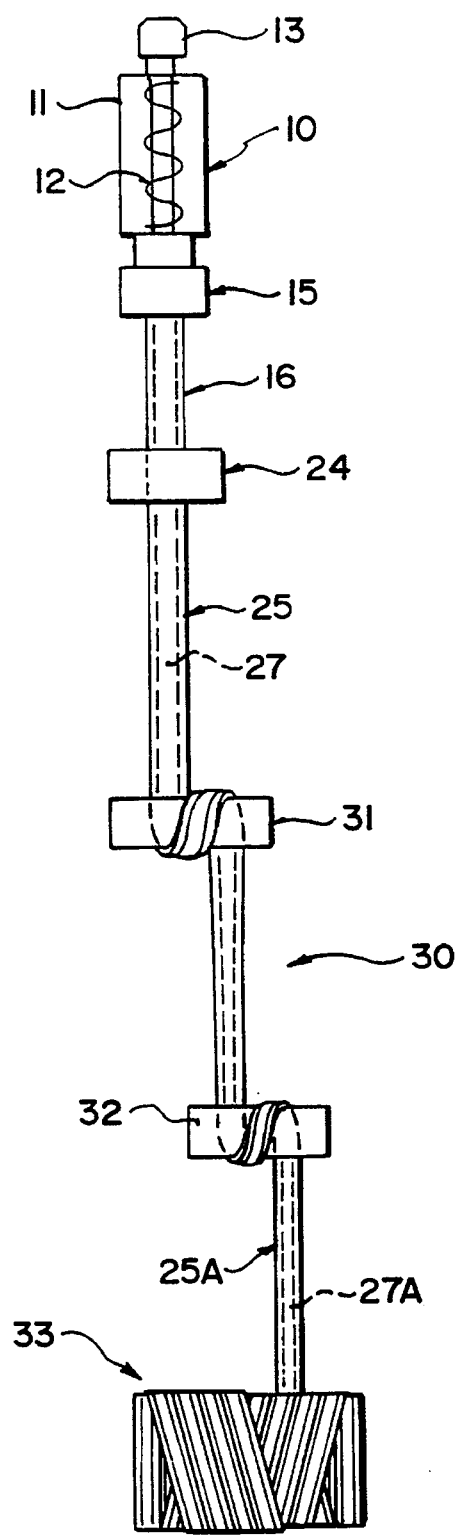

FORMING PRESSURE SENSITIVE ADHESIVE TAPE

This application is a continuation-in-part application of application Ser. No. 185063 filed Jan. 24, 1994 and now abandoned.

BACKGROUND OF THE INVENTION

This invention relates to a pressure sensitive adhesive (PSA) tape of high tensile strength and low elongation in a tape width less than 2.0 inches.

Pressure sensitive adhesive tapes with which the present invention is concerned are widely used as tear tapes, but in addition it may be possible to use tapes of the present invention as pressure sensitive strapping, as reinforcement for corrugated products and for similar purposes.

Tear tapes are widely used in packaging to tear a packaging material along a tear line defined by the tear tape. This is used in filmic packaging materials but also can be used with paper or board materials such as for soap boxes or courier envelopes. The tear tape thus forms a very small part of the packaging material but provides a function which is very important for customer satisfaction. It is of course desirable therefore to reduce the amount of material and cost involved in the tear tape construction.

Tear tapes conventionally comprise a strip of a suitable plastics material and generally polypropylene is chosen as this is relatively inexpensive and yet provides the required strength characteristics. The tear tape can have a width generally in the range 1/16th to 1/4 inch. The width is generally selected on the basis of minimum cost.

It is generally necessary to bond the tear tape to the packaging material in order to hold the tear tape in place during the manufacturing process and to locate the tear tape in place while it is tearing the packaging film to provide a clean straight tear line.

Some packaging processes include the application of adhesive to the tear tape on the packaging line so that an adhesive applicator is provided as part of the machine and applies the adhesive to the tear tape immediately prior to its application to the packaging film.

More recently tear tapes have been supplied in package form carrying a pressure sensitive adhesive on one surface. Such tapes are formed by slitting from a web of the tape material on which is already applied the pressure sensitive adhesive. This type of tape provides some problems in that the adhesive material extends to the side edges of the tape and therefore engages guides to cause transfer of adhesive material to the guides and can spread from the side edge of the tape onto other parts of the packaging material which interfere with the proper operation of the structure. A tape of this type is shown in U.S. Pat. No. 4,844,962 (May et al assigned to Payne Packaging Limited).

In prior U.S. Pat. No. 4,887,714 (O'Connor assigned to KT Industries Inc.) is shown a modified form of tear tape in which the pressure sensitive adhesive is applied as a narrow bead to the tear tape core layer after the tear tape has been slit from a web of the film. This process has been commercially successful and operates satisfactorily on the packaging machine.

Other types of pressure sensitive adhesive tape are also widely used. A tape as defined herein is a core layer of an extruded polymer material having a pressure sensitive adhesive on one side thereof, low elongation to break and a width less than 2.0 inches. Low elongation to break is defined herein as being generally of the order of 10 to 20% and certainly less than 40%. Tapes of this type can be used for various purposes including tear tapes as mentioned above which conventionally have a width in the range 1/4 down to 1/16 inch. Tabbing tapes often have a width in the range 1.0 to 2.0 inch. Reinforcement tapes often have a width in the range 0.5 to 1.0 inches. In all cases the above low elongation is required for the end use stated both in the finished product and also during processing of the tape to form the finished product during packaging of the tape, during unwinding of the package and also during application of the tape to the required substrate.

An extruded material is disclosed in Canadian Patent 977,629 (Plicoflex Houston Inc.) in which a strip of material is extruded onto a drum and cooled following which it is then transferred to a second drum and an adhesive material is applied to one surface. Downstream of the drum the tape is drawn by 25% to 50% which creates a material which is heat shrinkable and of high elongation. The tape of Plicoflex is often referred to in the specification as a film and it is certainly not clear whether the material as extruded is intended to be extruded in the width of the finished tape or whether slitting is intended. In any event the finished tape is intended to have a width greater than 2.0 inches in view of the stated end use of the tape. The material as extruded must be relatively wide (much greater than 2.0 inches) in view of the technique disclosed for applying the adhesive. The patent also refers on a number of occasions to "trimming" the film. Such a tape material as disclosed in Plicoflex is entirely unsuitable for the tape structure with which the present invention is concerned, that is the high strength, low elongation tapes as defined above.

A further coextruded pressure sensitive adhesive material is disclosed in U.S. Pat. No. 4,379,806 (Johnson & Johnson) in which a base polymer film is extruded with an adhesive material with the coextrusion causing a bonding effect between the layers. The patent interchanges use of the words "tape" and "film" but it is almost certainly clear that this material is indeed extruded in web width since the patent refers to trimming of the edges of the material and slitting the material into tape width using conventional techniques.

Generally, tear tapes are manufactured by slitting an extruded web of polypropylene or other suitable material which is oriented either monoaxially or biaxially by conventional processing. This web is then slit into a plurality of longitudinally continuous side-by side tapes which can be coated with adhesive in a process subsequent to the slitting as in the O'Connor patent set out above or can be coated in web width with the adhesive prior to slitting as in the May patent above.

There is an ongoing requirement to yet further reduce the costs of manufacture of PSA tape and to manufacture a PSA tape with minimum materials and minimum waste of materials in an efficient and cost effective manner.

SUMMARY OF THE INVENTION

According to one aspect of the invention there is provided a method of forming a single pressure sensitive adhesive tape of high strength and low elongation comprising extruding a core layer of plastics material so as to define on the core layer as extruded a first surface, a second surface opposed to the first surface and two opposed side edges, the core layer being substantially longitudinally continuous and having a predetermined first width; applying onto the first surface a layer of a predetermined first thickness of a hot-melt pressure sensitive adhesive material; subsequent to the application of the adhesive layer, stretching the core layer and the adhesive layer carried thereby so as to cause longitudinal orientation of the core layer, so as to cause a reduction in thickness of the adhesive layer and such that a width of the core layer between the side edges is reduced by the stretching from the first width to a second width equal to that of the single tape and less than 2.0 inches; the single tape being formed without slitting or trimming so that side edges of the single tape are defined by said two opposed side edges; and winding the single tape into a package.

This method in which the core layer is drawn such that a thickness of the adhesive layer is reduced can be used to cause the thickness of the adhesive to be less than can conventionally be obtained with hot-melt adhesive at speeds greater than can normally be obtained. Thus a thickness of less than 0.001 inch at a tape production or winding rate greater than 500 ft/min can be achieved.

The core layer is directly extruded in tape width that is the edges of the core layer as extruded form the edges of the finished tape without slitting.

A release agent can be applied if required to the side of the tape opposite to the adhesive although the increased adhesion between the adhesive and the core layer may avoid the necessity for the release layer. If applied the release agent can be impregnated in a separate release layer coextruded with the core layer. The release layer is a compatible polymer in which is impregnated a release agent of a conventional type. The amount of the release agent may be of the order of 2 to 10% and this amount can be reduced relative to conventional amounts by the fact that the coextrusion of the core layer and the hot melt adhesive provides a greater bond between the layers thus reducing the tendency of the adhesive layer to be stripped away by adhesion to the opposite side of the core layer. The use of the separate layer reduces the amount of the release agent used so as to reduce overall cost.

Coloring of the finished tape can be effected simply by adding a coloring agent into the polymer extruding the core layer.

The finished tape dimensions can lie in the range of 0.03 to 2.0 inch in width and 0.0005 to 0.010 inch in thickness. The method of the invention can allow manufacture of a tear tape of reduced width relative to conventional tapes for example down to 1/32 inch which reduces material content and increases the length of tape which can be supplied on a package to improve the efficiency of processing. The pressure sensitive hot melt adhesive is applied to the extruded core layer before the tape is oriented to its final thickness and width. When using a stretch of the order of 800%, the tape is approximately three times wider at the point of adhesive application than the finished width and it is therefore easier in this invention to apply the adhesive in a strip which is equal to or less than the width of the tape. Alternatively the hot melt adhesive can be coextruded with the core layer at the initial die either in full tape width or if required in reduced width. In this arrangement it may be necessary to provide cooling of that part of the die through which the adhesive passes since the adhesive generally can not tolerate temperatures required for the polymer for the extrusion process.

When using polypropylene it is necessary to obtain the required properties defined above to stretch the core layer by at least 700% and preferably 800%. The tape is of course thicker prior to the stretching and the thickness is reduced by the orienting process. As the hot-melt adhesive is applied to the cast polymer core layer or coextruded with the core layer prior to the orienting process the thickness of the adhesive is reduced proportionately during the orientation. This is extremely important because it is the goal of the present invention to have a minimal amount of adhesive in applications where high bonds are not required. The adhesive layer in the finished tape is thus preferably less than 0.001 inch and more preferably less than 0.0005 inch.

This feature is especially important because it is very difficult to apply hot melts in thicknesses less than 0.0005 inch. For best advantage PSA tapes for low tack applications have a finished thickness of adhesive in the 0.0001 to 0.0003 inch range and this can be readily obtained in the present invention.

The coextruded release layer is also of course reduced in thickness during the orientation step thus producing a thickness of the release layer in the finished tape which is preferably less than 0.0001 inch.

When using polyester as the polymer for extruding the core layer, the amount of extension necessary for obtaining the required properties is at least 300% and preferably 500%. This difference in the amount of stretch of the other layers is taken into account in determining the original thicknesses of the layers as extruded.

One other benefit of this process is there is no trim waste as the polymer is extruded in a profile that will be totally consumed by the process.

Also this process produces finished rolls of PSA tape that are totally splice free as the extruder can run continuously.

This approach to the manufacture of tapes is entirely opposed to current thinking in which the extrusion step is effected in extruders which are of increasing magnitude and capital cost in view of the expected improvement in efficiency obtained by scale. However this significantly increases the difficulty and cost of the slitting and winding stages for the manufacture of individual narrow adhesive tapes. Slitting is particularly difficult in narrow PSA tape in view of the difficulty of slitting through the adhesive layer.

Splicing PSA is a major problem as it is difficult to get PSA splicing tape to stick to the release coated side of the film. For this reason most manufacturers use a two side sticky tape with a film in the center which does not have the physical properties of the PSA tape. It is too thick, and production equipment is down while a splice is being made which is very costly. There is also a great danger of rolls not winding up properly after stopping and starting for splices. This process eliminates these problems. In addition the process uses cheaper base raw materials rather than more expensive partly converted materials. Yet further, the use of hot-melt adhesive avoids the use of volatile organic chemicals (VOC'S) which are becoming less acceptable in these environmentally conscious times.

The above details relate to any high strength, low elongation PSA tape which can be used in various end uses. In the tear tape end use, the amount of adhesive necessary can be relatively small so the adhesive has the thicknesses defined above and a width generally of the order of 90% to 70% of the width of the tape itself.

When used for strapping or similar reinforcement type tapes, the amount of adhesive carried on the tape is significantly increased so the thickness of the adhesive in the finished tape may be of the order of 0.0005 to 0.002 inch. Again however the width of the adhesive may be less than the width of the tape to prevent degradation of the adhesive at the edges of the tape and to prevent engagement of the adhesive with guides and the like. In such an arrangement, however, the width of the adhesive may be as much as 90% of the width of the tape.

In order to achieve the necessary strength and elongation properties required for the above tape, it is necessary to effect drawing of the extruded tape to an amount in the range 300 to 800% to achieve substantially complete orientation, depending on the type of polymer used. This generally results in a decrease in the thickness of the tape layer by an amount which can be as much as 66% when stretching by 800%, thus similarly reducing the thickness of the adhesive by the same percentage. In order to achieve the finished thickness required, therefore, it is necessary to apply adhesive to a thicker amount as defined above.

One embodiment of the invention will now be described in conjunction with the accompanying drawings in which:

BRIEF DESCRIPTION OF THE DRAWINGS

FIG. 1 is a cross sectional view through an extruded film substantially immediately after extrusion.

FIG. 2 is a cross sectional view of the film and layer of FIG. 1 after stretching to effect orientation of the film.

FIG. 3 is a side elevational view showing schematically a process for forming the structures of FIGS. 1 and 2.

FIG. 4 is a top plan view of the schematic illustration of FIG. 3.

In the drawings like characters of reference indicate corresponding parts in the different figures.

DETAILED DESCRIPTION

The process illustrated in FIGS. 3 and 4 includes an extruder head 10 with a barrel 11 and a screw 12 operated by a motor 13. The extrusion head further includes a die 15 acting to extrude a generally flat core layer 16 of the polymer after shaping into a required shape within the die slot. The shape of the die thus provides on the core layer a top surface 17, a bottom surface 18 and two opposed side surfaces 19 and 20.

In the embodiment shown in FIG. 1, the extruded core layer is coextruded with a lower layer 22 connected to the core layer by a tie layer 23.

For the purpose of providing the coextrusion, the head 10 shown only schematically will of course include more than one polymer supply screw for injecting the different types of polymer forming the layers 21, 22 and 23 and supplying them to the die 15.

Upon emerging from the extrusion head the extruded core layer simply enters a water bath schematically indicated at 24 for immediate quenching to a cooled condition.

Also coextruded with the core layer is an adhesive layer 27 of a hot-melt type. However as an alternative, the adhesive can be applied by a casting system downstream of the quenching 24.

The adhesive is of the hot-melt pressure sensitive type so that when set the adhesive is responsive simply to contact to actuate the adhesive effect.

Downstream of the water quenching is provided an orientation section 30 including capstan rollers (preferably of the type known as Godet rollers) 31 and 32. As is well known orientation of an extruded film or strip is necessary to generate structural stability and the required longitudinal strength and low elongation. This is achieved by simply stretching of the film and this case the stretching is effected monoaxially that is longitudinally simply by driving the capstan roller 32 at an increased speed relative to the capstan roller 31. In practice the amount of stretching required is of the order of 300 to 800% and this is well known to achieve the required orientation of the film or strip.

The cross section of the oriented core layer is shown in FIG. 2 and it will be noted that both the width W1 and the thickness T1 of the core layer indicated at 25A are decreased relative to the corresponding width W and thickness T of the core layer 25 as extruded. At the same time of course the thickness H1 of the adhesive layer 27A is significantly reduced relative to the thickness H of the layer 27 as applied.

Downstream of the orientation stage 30, is provided a winding station 33 which acts to wind the tape as shown in FIG. 4 into a package, the package having a width greater than the width of the tape so that the tape is traversed across the package during the winding process.

The tape is thus produced continuously at a tape production rate preferably in excess of 2000 feet per minute. The winding station 33 is preferably of a type which allows automatic change of one filled package for an empty spool in order that the tape can be continuously wound without wastage.

The process involves no slitting of the tape from any wider tape structure or web structure so there is no waste and all the material that is extruded forms part of the finalized tape wound into the package.

Turning to the tape structure shown in FIGS. 1 and 2, the coextruded tape structure of FIG. 1 includes a layer 21 which is of a plastics material forming the structural strength for the tape. The core layer 21 therefore is formed of a suitable plastics material for example polypropylene which has suitable strength properties for forming a tear tape for tearing packaging film and is of suitable cost. The layer 22 is formed of a material which has release characteristics relative to the adhesive layer 27A. The release layer 22 can therefore be formed of a polymer which is impregnated with a release material such as silicone. In some cases the polymer layer 21 and 22 may be compatible so they can be coextruded without the necessity for a tying layer 23. In other cases a bonding or tie layer 23 is necessary to ensure the formation of the different layers into an integral structure defining the tape body. In yet another arrangement, the main body of the core layer is formed from the impregnated polymer and only a thin tie layer is coextruded on top of the polymer to attach to the adhesive layer.

In the finished tape structure shown in FIG. 2, the width of the tape body 25A less than 2.0 inch and is preferably in the range 0.03 to 1.0 inch and the: thickness T1 is preferably in the range 0.0005 to 0.010 inch. These dimensions are similar to those used in conventional tear tapes. The thickness of the adhesive layer after the orientation stage is less than 0.001 inch and preferably less than 0.0005 inch and more preferably in the range 0.0001 to 0.0003 inch. This thickness of adhesive is sufficient to provide the minimal adhesive effect necessary in the packaging structure. However this thickness of adhesive cannot be achieved using a conventional hot-melt adhesive application techniques and the minimum thickness which can be achieved using such application techniques is of the order of above 0.0005 inch and then only at relatively slow speed. In the present invention, therefore, the application of the adhesive prior to the orientation stage allows the adhesive to be applied in a thickness in the range 0.001 to 0.003 inch as shown in FIG. 3 following which stretching of the tape by an amount in the order of 800% to 900% will reduce the thickness of the adhesive layer to the above stated dimensions. It will also be noted that the adhesive is applied in a band so that side edges 27B and 27C of the band of adhesive both when applied and in the finished tape are spaced inwardly of the side edges 19 and 20 of the tape body. This ensures that the adhesive in the finished tear tape is spaced from the edges of the tape to prevent degradation and blocking.

In the finished tape structure shown in FIG. 4, therefore, the tape body 25A is formed of polypropylene having a longitudinal strength which is sufficient to effect tearing in the conventional tear tape operation. The, layer 22 of the tape body acts as a release coating for engaging the adhesive layer 27A of the next underlying tape.

In coextruding the three layers of the core layer, the release layer and the hot melt adhesive layer, these materials are coextruded through a slot having the required dimensions so that the thickness and width of the tape thus formed is such that, after the required stretching to provide the necessary degree of orientation, the dimensions of thickness and width are tailored to the requirements of the finished tape.

As is known, the temperature for the extrusion of the base polymer is of the order of 450° to 500° F. for polypropylene and 550° F. for polyester. Hot melt adhesives at this temperature can break down and therefore it is necessary to effect cooling of a part of the die so that the hot melt adhesive is supplied at the required temperature for proper handling of the hot melt adhesive. This is generally of the order of 300° to 350° F. The extrusion is preferably effected at the order of 500 feet per minute. A suitable arrangement for the extrusion head is shown in the above mentioned patent to Johnson and Johnson.

It will be noted that the extrusion head generating the single tape is independent of other extrusion heads so that it is independent of breakdown of any other line. The extrusion head is also associated with the individual winding head for the particular tape line. The line can therefore run effectively continuously independently of other lines so that the finished package of tape is effectively splice free.

Downstream of the extrusion head, the extruded tape is immediately quenched in water to obtain the required cooling and setting of the substantially liquid materials into an amorphous plastics material prior to the orientation steps described above to obtain the required properties of the finished tape structure.

It will be appreciated that the manufacture of the tape as a coextruded core layer with the dimensions of the core layer tailored to produce, by the stretching, a tape of the required thickness and width allows the tape to be formed without the necessity for any slitting or trimming of the edges of the tape of any type. The side edges of the tape are therefore constituted by the same side edges of the core layer with those side edges simply being modified in dimension and position during the stretching process. This absence of slitting or trimming ensures that there is zero waste in the process of the manufacture of the tape.

This process is entirely opposite to the current thinking in the manufacture of tape. In current developments the initial extrusion process is of increasing size so that an extrusion line is of a massive nature including a huge capital initial cost. Such large extruded films need therefore to be slit a number of different times so as to gradually reduce the very wide initial film into a number of smaller films through a number of slitting stages. In the final processing of tear tape, for example, therefore, the master roll may only be of the order of 2 inches wide for the manufacture of 32 tapes of 1/16 inch width each. It will be appreciated that this number of slitting stages includes high complexity and difficulty leading to the possibility of a large number of breakdowns. The slitting of adhesive coated film is also very difficult since the slitting knives are very much influenced by the collection of adhesive which can occur onto the knife surface. Even very thin slitting knives in total add up to a significant proportion of the width of the film to be slit so that there is a relatively high drag. However despite these difficulties of slitting, the economics of the process are dependent upon the massive initial extrusion process and the present invention goes exactly against this trend providing an extrusion head of a size tailored to match the individual tape. This process is rendered economic by the fact that the very small extrusion line can run effectively continuously without any stoppages for break down of adjacent lines. In addition the processing speed is very high in view of the fact that the adhesive is applied at the extrusion stage or shortly thereafter and prior to the stretching step so the extrusion stage can run at a speed of the order of 500 feet per minute leading to a winding speed in the range 1500 to 4000 feet per minute depending upon the type of material to be processed.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of forming a single pressure sensitive adhesive tape of high strength and low elongation to break comprising extruding a core layer of plastics material so as to define on the core layer as extruded a first surface, a second surface opposed to the first surface and two opposed side edges, the core layer being substantially longitudinally continuous and having a predetermined first width; applying onto at least a part of the width of the first surface a layer of a predetermined first thickness of a hot-melt pressure sensitive adhesive material; subsequent to the application of the adhesive layer, stretching the core layer and the adhesive layer carried thereby so as to cause longitudinal orientation of the core layer to an extent to provide for the tape said low elongation to break, so as to cause a reduction in thickness of the adhesive layer and such that a width of the core layer between said side edges is reduced by the stretching from said first width to a second width equal to that of the single tape and less than 2.0 inches; the single tape being formed without slitting or trimming so that side edges of the single tape are defined by said two opposed side edges; and winding the single tape into a package.

2. The method according to claim 1 including providing on the second surface release characteristics which allow release of the second surface from contact with the adhesive material, should such contact occur.

3. The method according to claim 2 including providing the release characteristics in a layer coextruded with the core layer.

4. The method according to claim 1 wherein the adhesive layer is stretched to a thickness less than 0.001 inches.

5. The method according to claim 1 wherein the adhesive layer is stretched to a thickness less than 0.0005 inches.

6. The method according to claim 1 wherein the adhesive layer is applied along a central portion of the second surface and has side edges of the layer spaced from the side edges of the core layer.

7. The method according to claim 1 wherein the core layer is stretched to a thickness less than 0.003 inches.

8. The method according to claim 1 wherein the core layer is stretched to a thickness less than 0.001 inches.

9. The method according to claim 1 wherein the core layer is extruded through a die slot independent of die slots for other tapes and wherein the single tape is wound on a winding head directly associated with the die slot and independent of winding heads for other tapes.

10. The method according to claim 1 wherein said single tape has a width in the range 0.0625 to 0.25 inches.

11. The method according to claim 1 wherein the core layer is extruded from polypropylene and wherein the core layer is stretched by at least 700%.

12. The method according to claim 1 wherein the core layer is extruded from polyester and is stretched by at least 300%.

13. The method according to claim 1 wherein the core layer is extruded with a coloring material therein.

14. The method according to claim 1 wherein the single tape is wound into a package which is continuous without splice in the tape throughout the package.

15. The method according to claim 1 wherein the core layer is extruded at a speed greater than 500 ft/min and wherein the tape is wound at a speed greater than 2000 ft/min.

16. The method according to claim 1 wherein the core layer is stretched such that the tape has an elongation to break less than 40%.

17. The method according to claim 1 including providing the release characteristics in a layer coextruded with the core layer wherein the layer has a thickness less than 0.0001 inch.

* * * * *